United States Patent
Brostmeyer et al.

(10) Patent No.: US 8,789,377 B1
(45) Date of Patent: Jul. 29, 2014

(54) GAS TURBINE ENGINE WITH LIQUID METAL COOLING

(71) Applicants: Joseph D Brostmeyer, Jupiter, FL (US); John W Appleby, Jr., Jupiter, FL (US)

(72) Inventors: Joseph D Brostmeyer, Jupiter, FL (US); John W Appleby, Jr., Jupiter, FL (US)

(73) Assignee: Florida Turbine Technologies, Inc., Jupiter, FL (US)

(*) Notice: Subject to any disclaimer, the term of this patent is extended or adjusted under 35 U.S.C. 154(b) by 0 days.

(21) Appl. No.: 14/056,992

(22) Filed: Oct. 18, 2013

Related U.S. Application Data

(60) Provisional application No. 61/715,364, filed on Oct. 18, 2012.

(51) Int. Cl.
*F02C 7/12* (2006.01)
*F02C 7/00* (2006.01)

(52) U.S. Cl.
CPC ...................................... *F02C 7/00* (2013.01)

USPC ................................................ 60/806; 60/728

(58) Field of Classification Search
USPC ................ 60/39.511, 728, 806; 415/115–116
See application file for complete search history.

(56) References Cited

U.S. PATENT DOCUMENTS

| | | | | |
|---|---|---|---|---|
| 2,868,500 A | * | 1/1959 | Boulet | 416/96 R |
| 3,294,161 A | * | 12/1966 | Wood | 165/140 |
| 3,730,644 A | * | 5/1973 | Jubb | 416/95 |
| 5,782,076 A | * | 7/1998 | Huber et al. | 60/782 |
| 6,129,991 A | * | 10/2000 | Warnes et al. | 428/610 |
| 6,295,803 B1 | * | 10/2001 | Bancalari | 60/39.511 |
| 2007/0071607 A1 | * | 3/2007 | Esser | 416/241 R |

\* cited by examiner

*Primary Examiner* — Phutthiwat Wongwian
(74) *Attorney, Agent, or Firm* — John Ryznic

(57) ABSTRACT

A gas turbine engine with a closed loop liquid metal cooling fluid system for cooling stator vanes within the turbine, in which the stator vanes include a liquid metal cooling passage lined with Tantalum or Molybdenum and a liquid metal cooling fluid of Bismuth or Lead or Zinc or Tin or alloy mixtures of these metals.

3 Claims, 3 Drawing Sheets

GAS TURBINE ENGINE WITH LIQUID METAL COOLING

CROSS-REFERENCE TO RELATED APPLICATIONS

This application also claims the benefit to U.S. Provisional Application 61/715,364 filed on Oct. 18, 2012 and entitled GAS TURBINE ENGINE WITH LIQUID METAL COOLING.

GOVERNMENT LICENSE RIGHTS

None.

BACKGROUND OF THE INVENTION

1. Field of the Invention

The present invention relates generally to a gas turbine engine, and more specifically to a closed loop cooling circuit for the turbine of an industrial gas turbine engine.

2. Description of the Related Art Including Information Disclosed Under 37 CFR 1.97 and 1.98

A gas turbine engine includes a compressor to compress air that is passed into a combustor and burned with a fuel to produce a hot gas flow. This hot gas flow is then passed through a turbine that typically includes three or four stages of stator vanes and rotor blades to extract energy from the hot gas flow to drive the compressor and, in the case of an industrial gas turbine (IGT) engine, an electric generator.

The efficiency of the engine can be increased by passing a higher temperature gas flow into the turbine. A typical turbine inlet temperature for an engine is 3,000 degrees F. which is high enough to melt the first stage airfoils. To allow for the turbine parts to withstand this extreme temperature environment, the airfoils are cooled by passing cooling air through a complex cooling circuit formed within the airfoils. The compressed air passed through the airfoils for cooling is bled off from the compressor. Around 20% of the compressor outlet is used for cooling of various turbine airfoils. Since the cooling air does not perform any work in the engine, this is lost energy.

It is known to bleed a portion of the compressed air produced in the compressor section of a gas turbine engine for use as a cooling medium in the turbine portion of the engine. The compressed air may be injected into the flow of combustion gas to provide an insulating film over the turbine surfaces, or it may be passed through internal cooling passages formed in the hot turbine parts in a closed cooling system. One example of such a prior art device is illustrated in U.S. Pat. No. 5,782,076 issued to Huber et al. on Jul. 21, 1998, incorporated by reference herein.

A closed loop cooling system is used to improve the cooling effectiveness of the engine so that compressed air from the compressor is not required. U.S. Pat. No. 6,295,803 issued to Bancalari on Oct. 2, 2001 (incorporated herein by reference) discloses a gas turbine engine having a closed-loop cooling circuit for transferring heat from the hot turbine section to the compressed air produced by the compressor section. The closed-loop cooling system includes a heat exchanger disposed in the flow path of the compressed air between the outlet of the compressor section and the inlet of the combustor. A cooling fluid may be driven by a pump located outside of the engine casing or a pump mounted on the rotor shaft. The cooling circuit may include an orifice for causing the cooling fluid to change from a liquid state to a gaseous state, thereby increasing the heat transfer capacity of the cooling circuit. The Bancalari patent discloses that the cooling fluid can be steam, air, glycol, liquid metals or other cooling medium.

BRIEF SUMMARY OF THE INVENTION

The present invention is a closed loop cooling circuit for a gas turbine engine in which the turbine stator vanes have a cooling passage within lined with or formed with an insert or coating made from Tantalum or Molybdenum, and where a liquid metal cooling fluid of Bismuth is used to cool the stator vanes. The stator vanes can be formed from a standard nickel based alloy or from Molybdenum or another metal. Liquid bismuth has limited reactivity with Tantalum or Molybdenum at the very high temperatures that a cooling fluid would be exposed to in a turbine of a gas turbine engine.

In another embodiment of the present invention, a turbine stator vane is made from a typical metal material such as ferrous metal alloys, nickel alloys or cobalt alloys, and an insert or coating made of Molybdenum or Tantalum is placed inside to protect the outer vane material from reacting with a liquid metal such as Bismuth, Lead, Zinc, Tin, or alloy mixtures of Bi and Pb, alloy mixtures of Bi, Pb and Sn, or alloy mixtures of Bi, Sn and Indium (In). The insert or coating separates the liquid metal from the main vane material and allows for heat to be conducted from the main metal material to the liquid metal flowing through the insert. Other coatings for the vane material could be an oxide coating, or a thin coating of glass, silicon carbide or silicon nitride.

DETAILED DESCRIPTION OF THE INVENTION

The Applicants of the present invention have discovered that liquid metals would make an excellent cooling fluid for this type of closed loop turbine cooling system, but that most liquid metals react very strongly with the metallic materials being used in the turbine such as the vanes and blades. Modern engines use turbine rotor blades and stator vanes made from ferrous, nickel, columbium and cobalt based alloys. Bismuth, a good liquid metal for heat transfer process, will quickly react with nickel or cobalt based alloys such that both materials will be destroyed within minutes. What is therefore needed is a combination of materials for the turbine and the liquid metal that will not react with one another.

Figure 1:
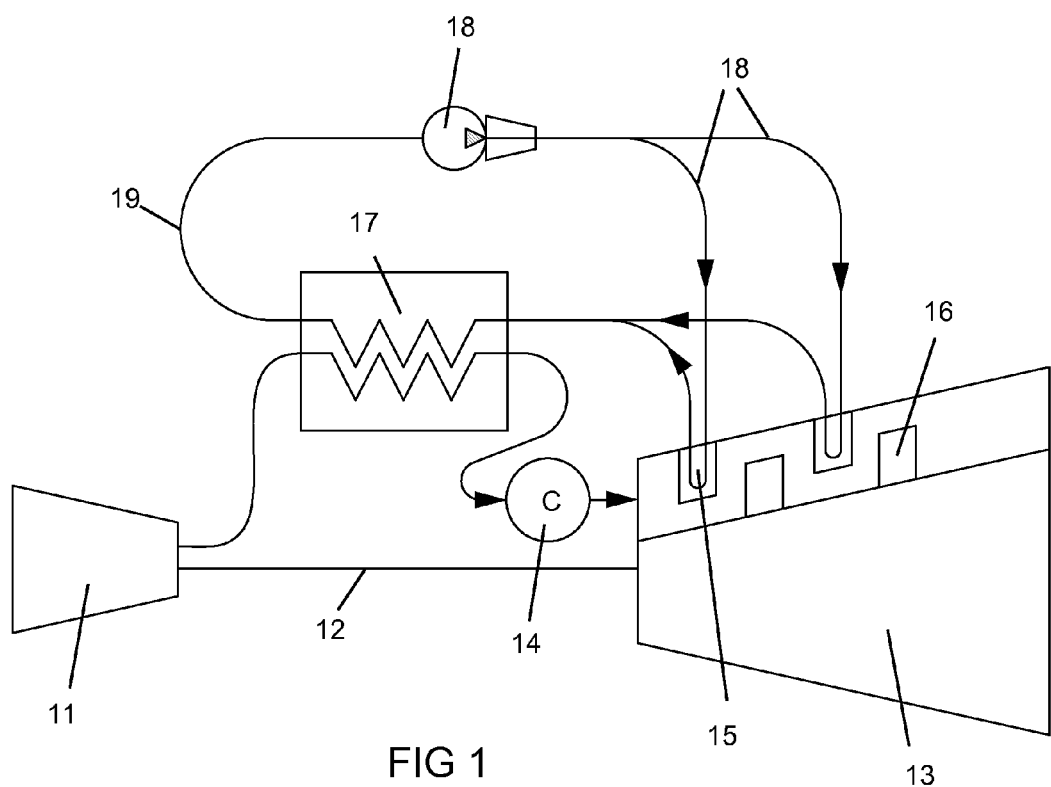
FIG. 1 shows a cross section view of the closed loop cooling circuit for the gas turbine engine of the present invention.

The closed loop cooling system using a liquid metal for a gas turbine engine is shown in FIG. 1 and includes a compressor 11 rotatably connected by a rotor shaft 12 to a turbine 13, a combustor 14 positioned between the compressor 11 and the turbine 13, two stages of stator vanes 15 and rotor blades 16, a heat exchanger 17, a cooling fluid pump 18, and cooling fluid lines 19 that form a closed loop cooling fluid passage with the stator vanes 15 that are cooled.

The heat exchanger 17 can be located inside the engine core as in the Bancalari patent or outside as in FIG. 1. The purpose of the heat exchanger 17 is to transfer heat from the stator vanes 15 and into the compressed air entering the combustor 14. The compressed air discharged from the compressor 11 is passed through the heat exchanger 17 and then into the combustor 14. The closed loop cooling circuit flows from the pump 18 and into the cooling circuit of one or more stages of stator vanes 15, through the heat exchanger 17 and then back into the pump 18.

The stator vanes with the internal cooling passages formed into the vanes is formed from a material that will not react with the liquid metal cooling fluid. In one embodiment, the stator vanes are made from Molybdenum or Molybdenum alloy or ferrous alloys or nickel alloys or cobalt alloys. Bismuth is a very good liquid metal for use at these high temperatures. The refractory metal Tantalum or Molybdenum can be used in replace of the ferrous or nickel or cobalt metals with the liquid metal bismuth used as the cooling fluid and will not react with the liquid bismuth. Bismuth or lead or zinc or tin can also be used as the liquid metal cooling fluid. The liquid metal fluid lines outside of the stator vanes are not exposed to such a high temperature as the stator vane so the fluid lines can possibly be made from another material such as iron based alloys.

In an embodiment in which Bismuth is used, a turbine stator vane can be made from a standard nickel based super-alloy but with the cooling fluid passage lined or coated with Tantalum or Molybdenum or with an insert made of Tantalum or Molybdenum. The liquid metal used for the cooling fluid would be Bismuth and would not react with the Tantalum or Molybdenum but would provide adequate cooling for the vane. The improved cooling capability of the liquid Bismuth would provide the extra cooling so that the standard nickel based super-alloys could still be used even with the higher gas stream temperature.

Molybdenum can be used with Bismuth as the cooling fluid if the cooling fluid can be purged from the cooling system prior to engine shutdown or prior to the parts cooling down. As the liquid Bismuth cools down, it expands upon solidification. This can cause the hollow parts in which the liquid metal flows to crack or break. Liquid Bismuth has a higher conductivity than air or steam cooling fluid and thus would make an excellent liquid metal cooling fluid, but it reacts harshly with modern materials used in airfoils of gas turbine engines which are nickel based. Molybdenum is an exotic high temperature resistant material, but is not used in airfoils because this material cannot be cast into an airfoil shape because of its high melting temperature or machined because of its hardness.

As the hot gas flow from the combustor enters the turbine and passes around the stator vanes 15, the liquid metal cooling fluid is pumped through the closed loop cooling circuit to transfer heat away from the vanes and into the cooling fluid. The heated cooling fluid is then passed through the heat exchanger 17 to add additional heat to the compressed air entering the combustor 14. Because of this system, compressed air from the compressor 11 is not required for cooling of the first stage stator vanes or the second stage stator vanes if these are also cooled by the liquid metal cooling fluid. The first stage rotor blades can still be cooled using compressed air from the compressor as is done in the prior art. The temperature of the compressed air discharged from the compressor is typically at around 1,100 F. Thus, with the cooling circuit of the present invention, compressed air from the compressor used for cooling is not required and therefore the system efficiency is increased.

Figure 2:
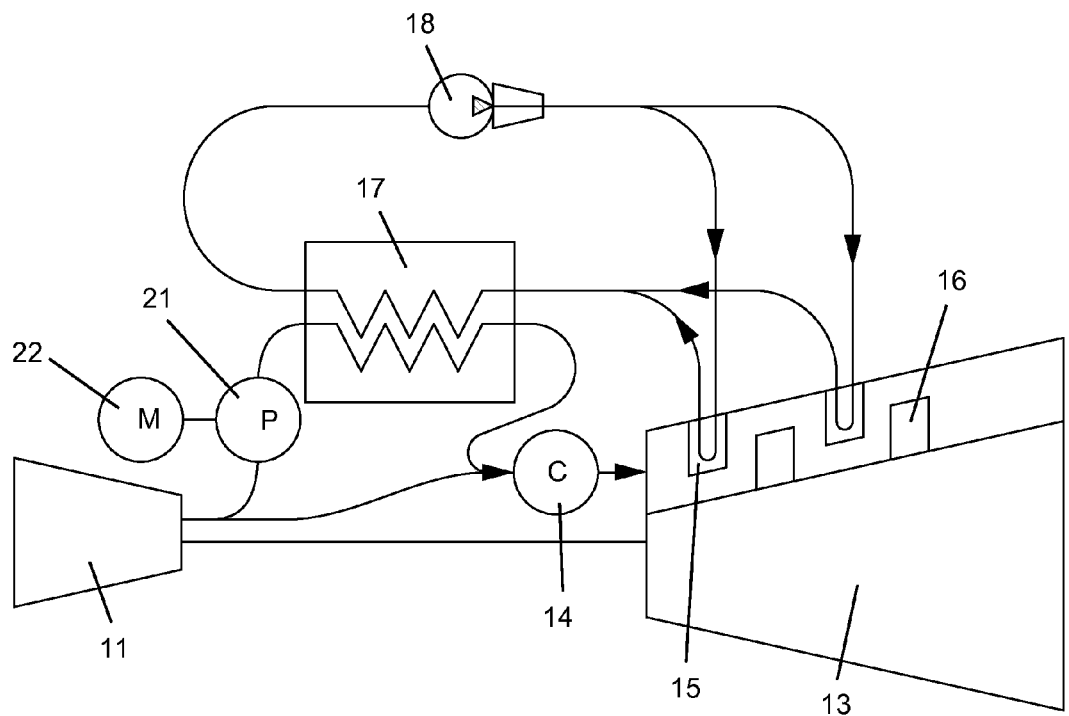
FIG. 2 shows a cross section view of a second embodiment of the closed loop cooling circuit for a gas turbine engine.

FIG. 2 shows a closed loop liquid metal cooling circuit for the gas turbine engine of FIG. 1 in which a portion of the compressor outlet air is passed through the heat exchanger prior to entering the combustor. In the FIG. 1 embodiment, all of the compressor outlet air is passed through the heat exchanger which produces around a 4% pressure loss (delta P loss) due to the heat exchanger pressure drop. The embodiment or FIG. 2 passes a portion of the compressor 11 outlet air straight into the combustor 14 while passing the remaining compressor outlet air through the heat exchanger 17 to pick up the heat from the liquid metal fluid passing through the heat exchanger. The heated compressor outlet air is then passed into the combustor 14 to be merged with the unheated compressor outlet air and burned within the combustor. The amount of compressor outlet air (represented as x in FIG. 2) can be from around 15% to 30%. The compressor 11 outlet air that flows into the heat exchanger 17 is increased in pressure by a fan 21 driven by a motor 22 by around 5% delta P in order to reduce the compressor work for most of the compressor discharge.

The FIGS. 1 and 2 embodiments are used to cool a stator vane 15 (first or first and second stage vanes) within the turbine 13 of the engine. However, other parts of the engine that are exposed to the high temperature gas flow can be cooled using a closed loop liquid metal cooling circuit of the present invention in which the heat exchanger is made of a material that will not react with the liquid metal cooling fluid. For example, the combustor 14 includes a liner exposed to the hot gas flow that can include a heat exchanger made of a material such as Molybdenum that has a liquid metal fluid cooling passage in which a liquid metal such as tin or zinc can be passed through to provide cooling for the combustor panel. The cooling fluid lines connected to the heat exchanger 17 can be made of the same high temperature resistant material, such as Molybdenum, if the liquid metal temperature is high enough to warrant the use of the same material. The heat exchanger 17 is exposed to a high temperature and is therefore made from a material such as Molybdenum that will not react with the liquid metal cooling fluid such as tin or zinc. If the liquid metal cooling fluid has a low enough temperature during the cooling process, then the fluid lines that carry the liquid metal cooling fluid through the closed circuit into and out of the heat exchanger (stator vanes) can be made from a different material from the heat exchanger, such as an iron based alloy.

The best liquid metal cooling fluid for the high temperatures required for use in a gas turbine engine would be Bismuth. Tantalum is a refractory metal with a high melting point of 5,425 degrees F. and a high resistance to corrosion, including corrosion in body fluids. In tests, liquid Bismuth showed limited reaction with Tantalum at temperatures as high as 1,525 degrees F.

Figure 3:
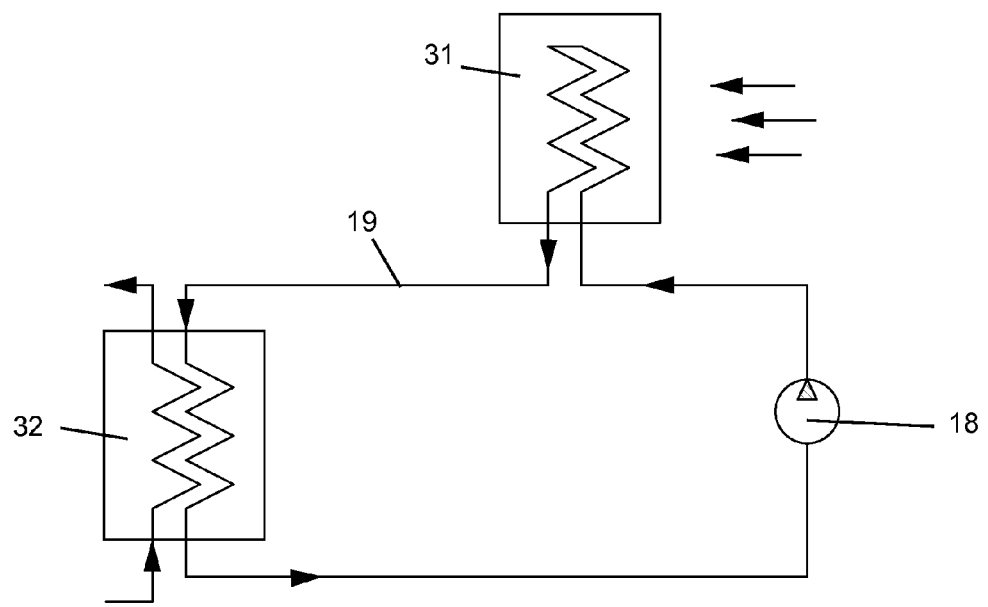
FIG. 3 shows a cross section view of a closed loop liquid metal cooling circuit used in a heat exchanger exposed to a high temperature fluid flow of the present invention.

One system that the heat exchanger with the closed loop liquid metal cooling circuit of the present invention can be used in is a solar energy concentration receiver used to produce electrical power from sun rays. Such a system reflects the solar energy light from mirrors and concentrates the solar power in a small area such that a high temperature can be applied to a fluid. FIG. 3 shows this system in which the solar concentrator includes a first heat exchanger 31 with the closed loop cooling fluid circuit within to absorb the heat from the concentrated solar rays and transmit the heat to the liquid metal cooling fluid. The heated liquid metal cooling fluid is then passed through a second heat exchanger 32 that is used to transfer heat from the liquid metal fluid to air or water to produce a hot gas flow such as heated air is steam from the heated water. This hot gas flow is then passed through a turbine to drive a generator and produce electric energy. In the FIG. 3 system, the first heat exchanger 31 is lined with of a material that will not react with the liquid metal cooling fluid, such as Molybdenum or Tantulum while the liquid metal is bismuth or tin or zinc or Irad or combinations of these. The second heat exchanger 32 is not exposed to a high temperature like that in the first heat exchanger 31, and therefore can be possibly be made from a conventional ferrous materials. The second heat exchanger 32 can used to heat up a second fluid such as water to produce steam or air for use in a steam turbine. A liquid metal cooling fluid pump 18 is also used in the FIG. 3 embodiment to pump the cooling fluid through the closed loop system.

Figure 4:
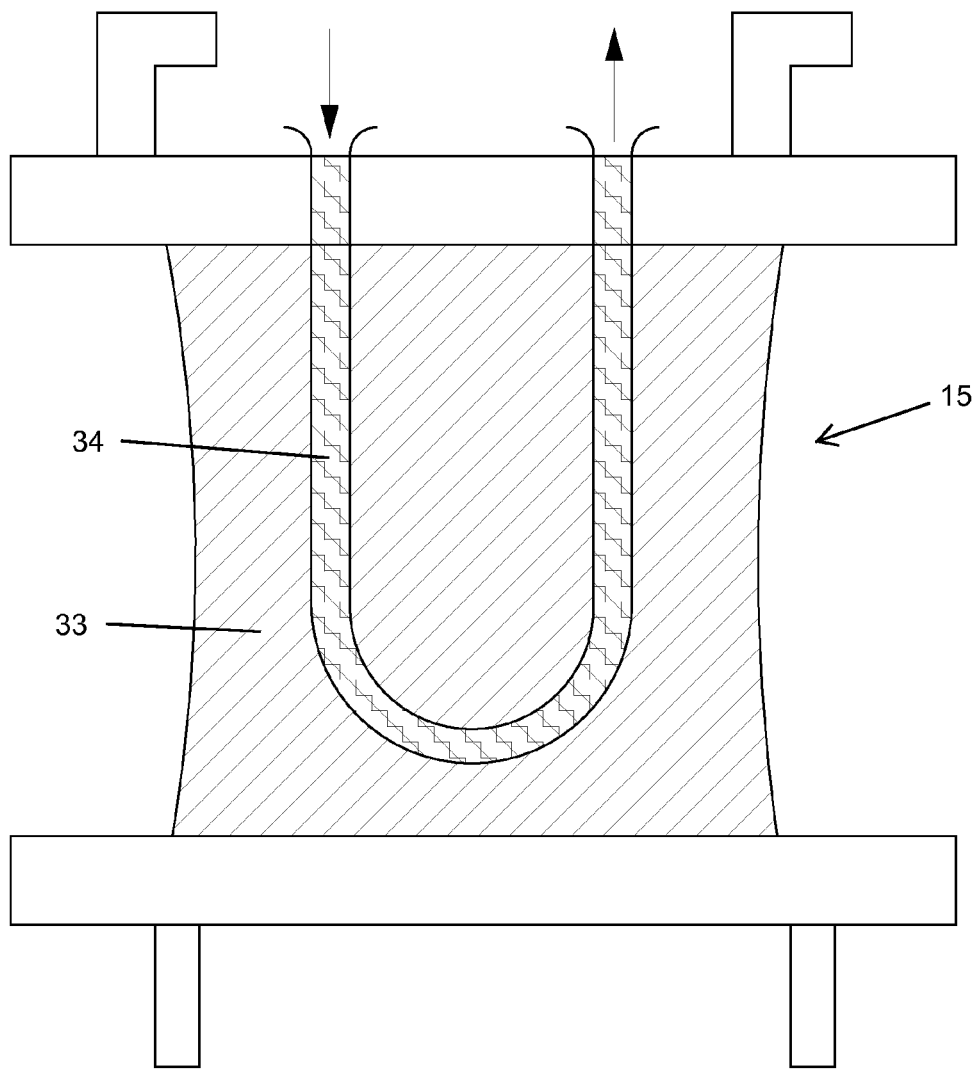
FIG. 4 shows a cross sectional view of a turbine stator vane with a metal insert secured inside for cooling the vane using a liquid metal according to one embodiment of the present invention.

In another embodiment of the present invention, a stator vane is made from a typical turbine airfoil material such as ferrous alloys or nickel alloys or cobalt allows, but includes an insert or coating within the cooling flow passage made from a material that will have limited reactivity with a liquid metal used for cooling of the vane. FIG. 4 shows a stator vane 15 with a main body 33 made from a material such as a Nickel alloy with an insert 34 or a coating of a material such as Molybdenum or Tantalum to protect the main body material from the liquid metal material such as Bizmuth. The insert 34 will be made from Molybdenum or Tantalum and is secured within the airfoil 33 without being bonded to the airfoil but to allow for heat to be conducted from the vane metal to the liquid metal through the insert. The liquid metal can be Bismuth (Bi), Lead (Pb), Zinc (Zn), Tin (Sb), or alloy mixtures of Bi and Pb, alloy mixtures of Bi, Pb and Sn, or alloy mixtures of Bi, Sn and Indium (In). Use of Molybdenum or Tantalum for the insert will have a limited reactivity with the liquid metal in the temperature range for a cooled turbine stator vane. The stator vane with the liquid metal cooling insert is intended for use in a non-rotating airfoil such as the stator vane and not for a rotor blade because of the high centrifugal forces involved, and the difficulty of sealing rotating parts.

Instead of an insert, the passage within the vane 33 could be coated with the material such as tantalum or molybdenum. Or, an oxide coating could be used. Another material for the coating could be glass in a thin layer. The glass composition would be tailored to optimize its thermal conductivity to allow for affective heat transfer to the liquid metal while providing protection to the base metal. The coating could also be silicon carbide or silicon nitride.

The liquid metal cooling circuit of the present invention can be used in other devices besides a turbine of a gas turbine engine. A nuclear power plant with a steam generator could also make use of a liquid metal cooling circuit. A solar collector and power plant could also make use of a liquid metal cooling circuit to provide cooling or to extract heat for use elsewhere in the system.

We claim:

1. An industrial size gas turbine engine comprising:
   a compressor;
   a turbine rotatably connected to the compressor;
   a combustor to receive compressed air from the compressor and produce a hot gas flow that enters the turbine;
   a first stage turbine stator vane of the industrial size gas turbine engine made from a base material of either a ferrous alloy, a nickel alloy or a cobalt alloy;
   a closed loop liquid metal cooling circuit passing through the first stage turbine stator vane to provide cooling;
   a heat exchanger to transfer heat from the first stage turbine stator vane and into the compressed air entering the combustor;
   the closed loop liquid metal cooling circuit within the first stage turbine stator vane having a liner made substantially of Molybdenum or Tantalum to prevent contact of the liquid metal with the base material of the first stage turbine stator vane; and,
   the liquid metal cooling fluid includes Bismuth or Lead.

2. The industrial size gas turbine engine of claim 1, and further comprising:
   the closed loop liquid metal cooling circuit also passes through a second stage stator vane to provide cooling.

3. The industrial size gas turbine engine of claim 1, and further comprising:
   the liquid metal cooling fluid passage within the vane includes an insert secured within the first stage turbine stator vane.

* * * * *